UNITED STATES PATENT OFFICE.

DANIEL SHATTUCK, OF CHICAGO, AND CLINTON K. DANIELS, OF MONEE, ILLINOIS.

IMPROVEMENT IN THE MANUFACTURE OF SOAP.

Specification forming part of Letters Patent No. 43,527, dated July 12, 1864.

*To all whom it may concern:*

Be it known that we, DANIEL SHATTUCK, of Chicago, in the county of Cook and State of Illinois, and CLINTON K. DANIELS, of Monee, in the county of Will and State of Illinois, have invented a new and useful Improvement in Processes of Manufacturing Soap; and we do hereby declare that the following is a full, clear, and exact description of the same.

The nature of our invention consists in a novel process of incorporating cornmeal with saponified oil or grease, and thereby producing a soap of superior quality at a much less expense than soaps now in use.

To enable those skilled in the art to practice and use our invention, we will describe the same with particularity.

To make twenty thousand pounds of our improved soap we proceed as follows: We take one thousand pounds of cornmeal and saturate it with cold water, stirring it thoroughly, so as to prevent it from gathering into lumps. We then put into a kettle of suitable dimensions about six hundred and twenty-five gallons of water and one hundred and twenty-five gallons of alkali of a strength of from five to ten degrees, and heat the mixture to the boiling-point, and add thereto the cornmeal prepared as aforesaid and stir it thoroughly. When the whole compound again begins to boil we add one hundred and twenty-five gallons more of alkali of a strength of about ten degrees, and boil again for about five minutes, when the compound will have become converted into a transparent amber-colored jelly or vegetable soap formed by saponifying cornmeal separately. The above materials will produce about ten thousand pounds of the saponified meal. We then manufacture ten thousand pounds of oil-soap, or soap produced by the ordinary process of saponifying oil or other grease. While the latter is boiling we then add thereto the aforesaid preparation of meal and keep up the heat until the whole mass becomes incorporated in one homogeneous mass, which, when cold, is of the proper consistency to cut into bars for commerce.

Our process, it will be observed, consists in treating the cornmeal separately before adding it to the saponified tallow or grease, thus saponifying the meal and grease separately, and then uniting both in a homogeneous mass.

To the soap thus prepared the addition of a small quantity of deodorized petroleum has a beneficial effect.

We are aware that cornmeal has been used before in manufacturing soap; but when used heretofore it has been mixed with the animal soap in an unsaponified form, whereas we saponify it in substantially the same manner as the oil or grease before uniting or combining the meal with the animal soap.

The proportions herein described may be varied, and the process of saponifying the meal may also be varied, the main point being that the two bases of the soap—vegetable and animal—be saponified separately, and then combined together.

What we claim as our invention, and desire to secure by Letters Patent, is—

The manufacture of a bibasic soap composed of cornmeal and animal oils or grease by the process herein described.

DANIEL SHATTUCK.
CLINTON K. DANIELS.

Witnesses:
W. E. MARRS,
F. H. BROWN.